US 6,725,387 B1

(12) United States Patent
Lindsay et al.

(10) Patent No.: US 6,725,387 B1
(45) Date of Patent: Apr. 20, 2004

(54) METHOD AND APPARATUS FOR CAUSING COMPUTER SYSTEM INTERCONNECTION TO BE IN THE SAME STATE EACH TIME TEST CODE IS EXECUTED

(75) Inventors: Dean T. Lindsay, Milpitas, CA (US); Robert D. Snyder, Palo Alto, CA (US); Kent A. Dickey, Westford, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/560,904

(22) Filed: Apr. 28, 2000

(51) Int. Cl.[7] .......................... G06F 1/12; G06F 11/00; G01R 31/28
(52) U.S. Cl. ..................... 713/400; 714/30; 714/724
(58) Field of Search .................. 713/400, 401; 714/31, 30, 39, 730, 724, 727; 716/4, 5, 1; 709/103

(56) References Cited

U.S. PATENT DOCUMENTS

| 4,827,476 | A | * | 5/1989 | Garcia ........................ 714/728 |
| 5,596,584 | A | * | 1/1997 | Warren ........................ 714/726 |
| 5,596,749 | A | * | 1/1997 | Cantrell et al. ............. 709/103 |
| 5,717,702 | A | * | 2/1998 | Stokes et al. ............... 714/730 |
| 5,757,819 | A | * | 5/1998 | Segars ........................ 714/727 |
| 5,818,344 | A | * | 10/1998 | Sharpe ................... 340/825.21 |
| 6,076,177 | A | * | 6/2000 | Fontenot et al. ............. 714/724 |
| 6,336,088 | B1 | * | 1/2002 | Bauman et al. ................ 703/15 |
| 6,473,476 | B1 | * | 10/2002 | Banks ........................ 375/354 |

FOREIGN PATENT DOCUMENTS

JP 07028662 A * 1/1995 ........... G06F/11/22

OTHER PUBLICATIONS

IBM, Processor Reset Control for Hardware Verification, Apr. 1, 1994, vol. 37, Issue 4B, pp. 679–680.*

* cited by examiner

Primary Examiner—Thomas Lee
Assistant Examiner—Suresh K Suryawanshi

(57) ABSTRACT

A method and apparatus are disclosed for improving the repeatability of a system during testing by ensuring that the machine state remains the same on every test. In particular, the system ensures that the polling block of a cross-bar chip is reset to the same point in the polling sequence and to the same port upon the start of every test. The system uses a global framing clock ("GFC") as a common timing reference. Before executing test code, the system becomes idle and waits for a rising edge of the GFC. The system then sends a message across existing links from the monarch processor performing the test to a cache controller chip. The cache controller chip waits for a GFC edge and then sends a reset message to the cross-bar chip to reset the CSR polling block. The cross-bar chip receives the signal and resets the CSR polling block.

19 Claims, 4 Drawing Sheets

METHOD AND APPARATUS FOR CAUSING COMPUTER SYSTEM INTERCONNECTION TO BE IN THE SAME STATE EACH TIME TEST CODE IS EXECUTED

TECHNICAL FIELD

The technical field relates generally to computer architecture and more particularly, but not by way of limitation, to a system for testing the design of a computer system by making the hardware state of the system repeatable.

BACKGROUND

In the field of integrated circuit (IC) chip and computer system design, it is necessary to test the chips and systems to identify any bugs that may exist. The testing of computer hardware involves testing the hardware using test program code sequences. The test programs attempt to cause improper computer operation by creating different time sequences of operations. To achieve sufficient test coverage, many prototype systems execute code at once.

However, debugging becomes more difficult as the level of system complexity increases. The debugging process is expensive in terms of time spent identifying bugs and the equipment that must be used in this process. In complex systems, it is impractical to monitor every signal from a system under test. Instead, when an error is detected during a test, the test is re-executed on an instrumented prototype to isolate the cause of the failure. To reproduce the test failure on the instrumented prototype, it is essential that the test program execute with the test hardware in exactly the same state that existed when it executed on the original system on which it failed. When a system is designed so that an executing test program finds the same hardware state during its execution as it encountered during its previous execution, the system is said to be repeatable. If the system is not repeatable, then the debugging process takes substantially longer because the same error or bug may not appear in a subsequent run of the same test program.

Unfortunately, without taking special measures, systems are not repeatable. One source of non-repeatability relates to arbitration between various sources in the system. In particular, systems may poll multiple data ports, or perform some other function, over a period of time in order to process data from the various ports. Without special measures being taken, the system hardware may be polling a different port each time a section of test code is executed. An error may be detected only when a particular data port is polled at a certain time. If the system is in a different state, polling a different data port on every test, repetition of the error may not be revealed. What is needed is a means of ensuring that the system will be in the same state each time that the test code is executed.

SUMMARY OF THE INVENTION

A method and apparatus are disclosed for improving the repeatability of a system during testing by ensuring that the machine state is the same during every test repetition. In particular, the system ensures that the polling block of a cross-bar chip is reset to poll the same port starting at the same time relative to the start of every repetition of the test. The system uses a global framing clock ("GFC") that operates at a lower frequency than the system clock as a common timing reference. The GFC is designed to have a common rising edge that corresponds to a rising edge on every other clock used in the system and is used to synchronize other system clocks. Before executing test code, the processor executing the test waits for the system to become idle and then waits for a rising edge of the GFC. The processor then sends a message across existing links from itself to a cache controller chip. The cache controller chip waits for the next GFC edge and then sends a reset message to the cross-bar chip across its link to reset the CSR polling block. The cross-bar chip receives the message and resets the CSR polling block on the next GFC edge.

In a system using multiple cross-bar chips with multiple cache controller chips connected thereto, the CSR polling blocks in each of the cross-bar chips, or a subset thereof, may be reset using the method. The controlling processor sends a reset message through the cross-bar chips to one of the cache controller chips associated with each cross-bar chip, beginning with the cross-bar chip furthest away. Each of cache controller chips send a reset CSR polling command to their associated cross-bar chips, which causes the CSR polling blocks to be reset. Each time that the test is executed, the method and apparatus ensure that the polling is reset at the same time relative to test execution.

DETAILED DESCRIPTION

The system ensures repeatability of the hardware state for purposes of debugging the system. The purpose is to ensure that the test software causes the events to occur at the same point in time relative to the state of all of the other hardware. For example, if a cross-bar chip is performing a certain function when the test starts, the system ensures that the test will always start at the same point in the cross-bar chip's routine or process. By starting at the same point in the same state, the test is more likely to expose the failure on a subsequent run than would otherwise be the case. For the system to be repeatable, the stimulus from the process running the test should always arrive at the same point in the hardware's operation.

A system may have multiple clocks creating multiple clock domains, including a system clock with frequency F. A first requirement for creating a repeatable system is to create a common reference point with respect to the system. The system makes itself repeatable by creating a common timing reference throughout the system. This can be done, for example, by creating a synchronous global framing clock ("GFC"), which operates at a lower frequency than the system clock and has an edge that corresponds to and is aligned with an edge of the system clock, such that the state of every clock in the system or subsystem or chip is the same at a known time. For instance the GFC may have a rising edge at the same time that every other clock in the system has a rising edge. Alternatively, the aligned edge may be a falling edge. The GFC is described more fully in a pending U.S. patent application filed on the same date as this application, by James C. Farmer and Kent Dickey entitled, "Method and Apparatus for Allowing Repeatable System Behavior in an Integrated Circuit with Multiple Clock Domains," which is hereby incorporated by reference.

As used herein, the term GFC refers to any clock or data stream that functions similar to a clock. For instance, in one embodiment, a clock may be used as an input to a flip-flop or other such device and the GFC may be created from the data stream that is the output of the flip-flop. Also, the GFC may be a newly created clock or it may be an existing clock used for various system functions having an edge aligned with other clocks. The GFC may be derived from the system clock through a clock splitter or other device, or it may be its own, separate clock.

The GFC is used as a common reference for timing. It may be used in an isolated IC, or it may be distributed throughout an entire system or subsystem. This GFC is used to control asynchronous events by preventing these events from occurring until the GFC sends a certain signal, such as one corresponding to a rising edge.

Figure 1:
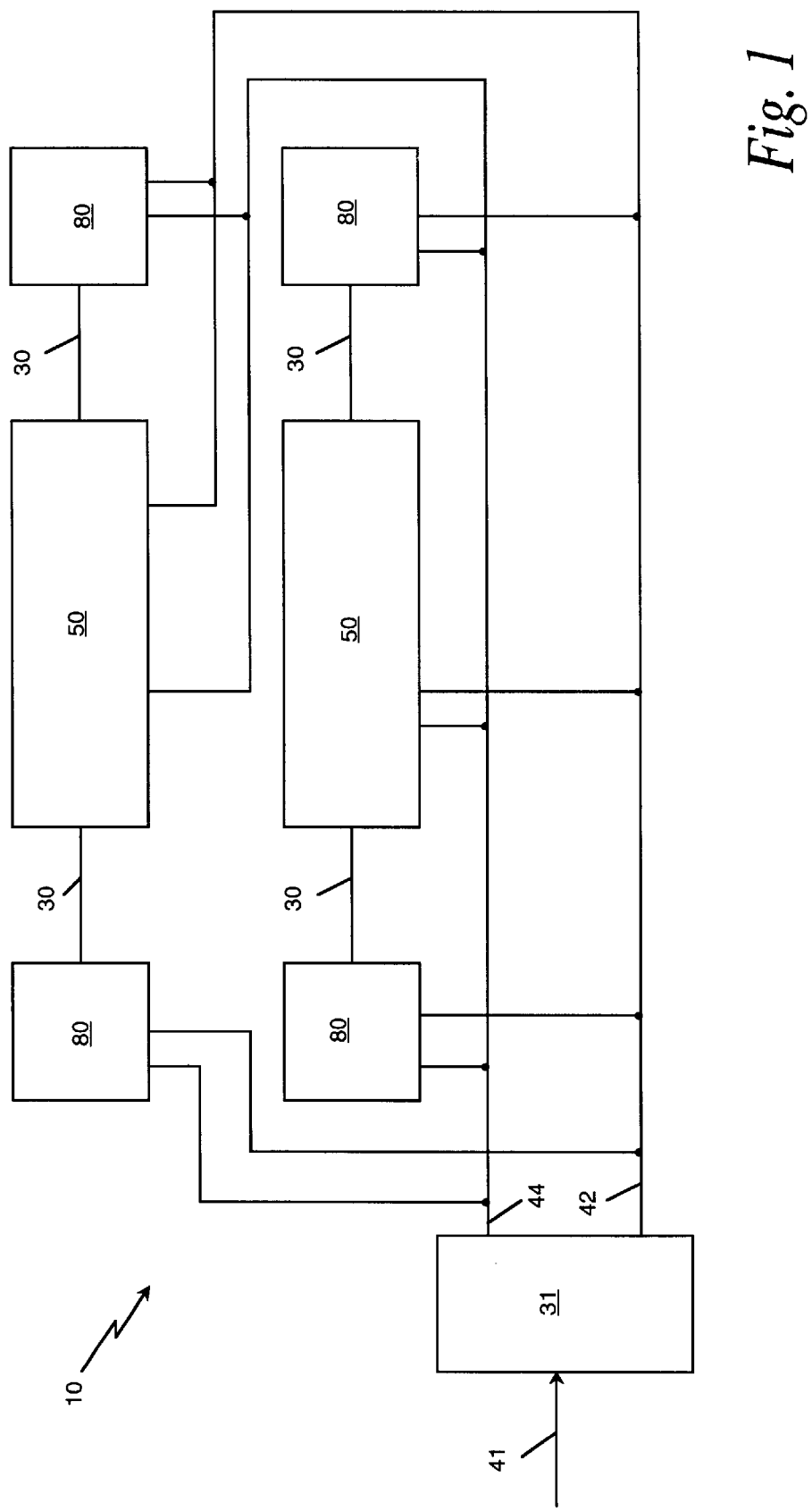
FIG. 1 is a block diagram of the system shown in FIG. 1 illustrating the clock connections.

FIG. 1 shows a system 10 having multiple processors 80 and cross-bar chips 50 interconnected by links 30. The system 10 has a system clock 41 and a GFC 44. The implementation shown creates the GFC 44 by sending the system clock to a clock divider 31. The clock divider 31 splits the system clock 41 into lower frequency clocks. Two output clocks are taken from the clock divider 31 and sent throughout the system 10, instead of simply sending the system clock 41. The fast clock 42 has the same frequency of the system clock 41, and the GFC 44 has a frequency equal to the lowest common denominator of all clocks in the system 10, or to a divisor thereof. These two clocks may be sent throughout the system or subsystem, and specific chips or groups of chips may create additional synchronous clocks with varying frequencies.

Running the GFC 44 throughout the system 10 creates a common reference for all other system events, which aids in timing repeatability. Thus, the GFC 44 may control all of the chips when a particular function is tied to its state. For instance, a reset function that is tied to the state of the GFC 44 will necessarily occur at the same time in every chip, because every chip is tied to the GFC 44. With appropriate use, the GFC can be used for system time synchronization, thus avoiding the routing of multiple synchronized signals, which would be expensive and difficult.

A second step in improving state repeatability involves the handling those system functions whose state is different on succeeding edges of the GFC, such as arbitration between data sources. As described herein, arbitration, and more particularly data polling, are used as examples of a system whose function may span more than one GFC cycle, thus causing it to be in a different state on succeeding edges of a clock cycle. Data polling is used as an example only, and is not intended to limit the scope of the invention.

One problem arises when the data sources are polled on a fixed-time basis, and the time required to poll all of the data sources may vary from or exceed the time required to complete a GFC cycle. For example, in one embodiment a cross-bar chip may receive data from nine different locations, or ports, which it polls in round robin fashion. For each of these ports, the CSR polling block waits for a certain number of system clock cycles while it retrieves and processes data. If the time to complete a polling cycle across the nine ports is longer than a GFC cycle, then the location from which data is initially received on the start of the test will vary depending upon which GFC cycle is used to synchronize the start of the test. If a test problem picked an arbitrary GFC cycle on which to start the test, then the system would not necessarily receive data from the same location, the system would not be repeatable, and an error that occurred on an initial test run might not surface on a subsequent run of the test.

Figure 2:
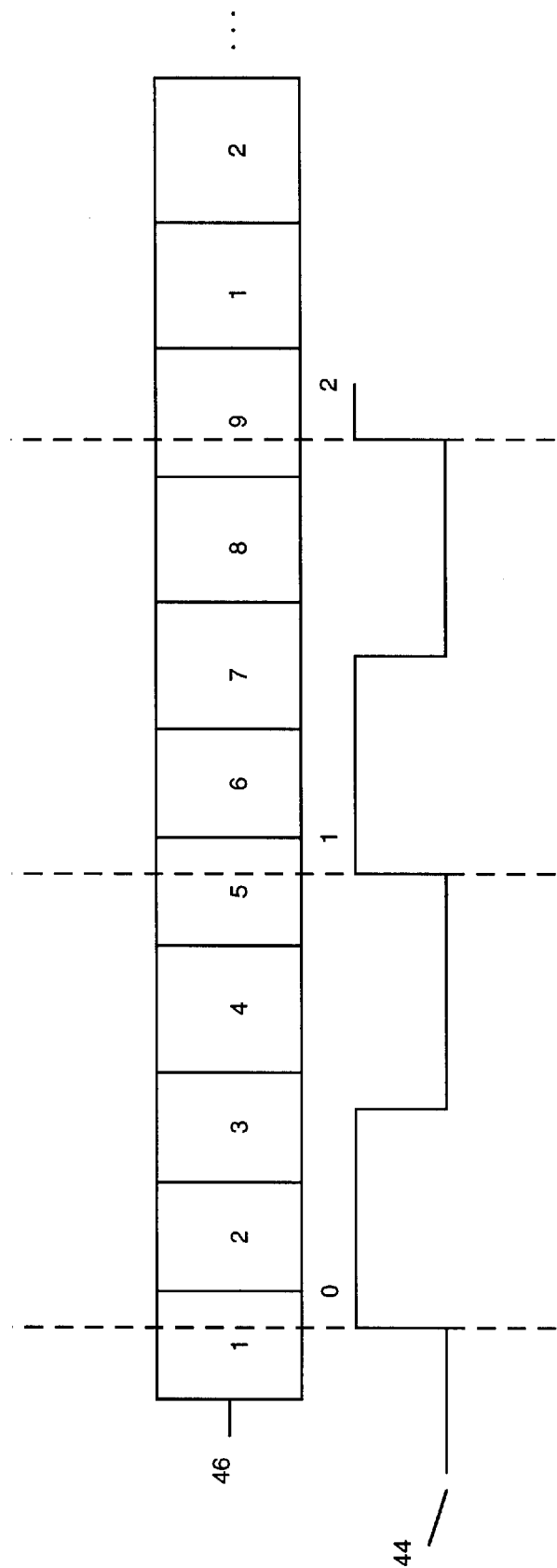
FIG. 2 is a timing diagram illustrating the polling process.

Referring to FIG. 2, on start-up the CSR polling block (52 in FIG. 3) of a cross-bar chip 50 goes through a polling cycle. For a period of several system clocks, the CSR polling block (52 in FIG. 3) looks at one particular port for receiving data. Then it moves to the next port for a fixed time, and so on, throughout all ports from which the cross-bar chip 50 receives data. FIG. 2 shows an example of a polling cycle of a system in which the cross-bar chip 50 polls nine different sources 46 labeled 1–9, along with the corresponding GFC 44. Each of the nine slots corresponds to a data location. As noted, the CSR polling block (52 in FIG. 3) spends a period of time polling each source. After it reaches the ninth slot, the system returns to poll slot 1, in round robin fashion.

As indicated by FIG. 2, the time required to complete an entire polling cycle may be greater than the length of a single GFC cycle, depending upon the GFC frequency, the number of polling sources, and the length of time spent polling each slot. If a test program chose an arbitrary GFC cycle on which to start, then the polled data at the beginning of the test would vary. If, for example, in FIG. 2 the test began on the zero rising edge of the GFC 44, then the data would be polled from port 1. On the other hand, if the test began on rising edge one of the GFC 44, then the data polled would be from port 5. A further complication not illustrated in FIG. 2 is that the GFC period may not be an integral multiple of the polling period. For example, the GFC period may be 32 system clock cycles, but the polling cycle might require 10 system clocks per port. Thus, not only is the port number different at different GFC edges, but the point in the polling cycle may be different. With an arbitrary starting point, then, the system is not repeatable because data may come from different ports and the polling cycle can be at different points on each subsequent run of the test. Thus, a bug might not reappear. That is, a bug that was exposed when polling port 1 at a particular time might not be seen when polling port 5 at that same time, because the machine state would be different. The processor 81 would have no way of knowing where in the polling cycle the CSR polling block (52 in FIG. 3) is.

What is needed is a means of forcing the polling cycle into the correct state synchronized to a point in the GFC cycle. One way of accomplishing this would be to directly connect the processor to every other cross-bar chip 50 throughout the system and resetting all of the cross-bar chips 50 with this wire. This, however, would cause the same problems discussed above with respect to routing multiple wires throughout the system and would defeat a purpose of the GFC 44.

Instead, the system uses the edge of a GFC 44 as a hardware synchronizing signal that can be used by test software as a hardware synchronization point. In order to achieve test repeatability, it is necessary to guarantee that the hardware state on a given GFC edge is predicable. One implementation of the hardware may include cross-bar chips 50 with associated hardware distributed throughout the system. The cross-bar chip 50 contains a CSR polling block (52 in FIG. 3) which will not be synchronized to the given GFC edge unless special measures are employed.

Figure 3:
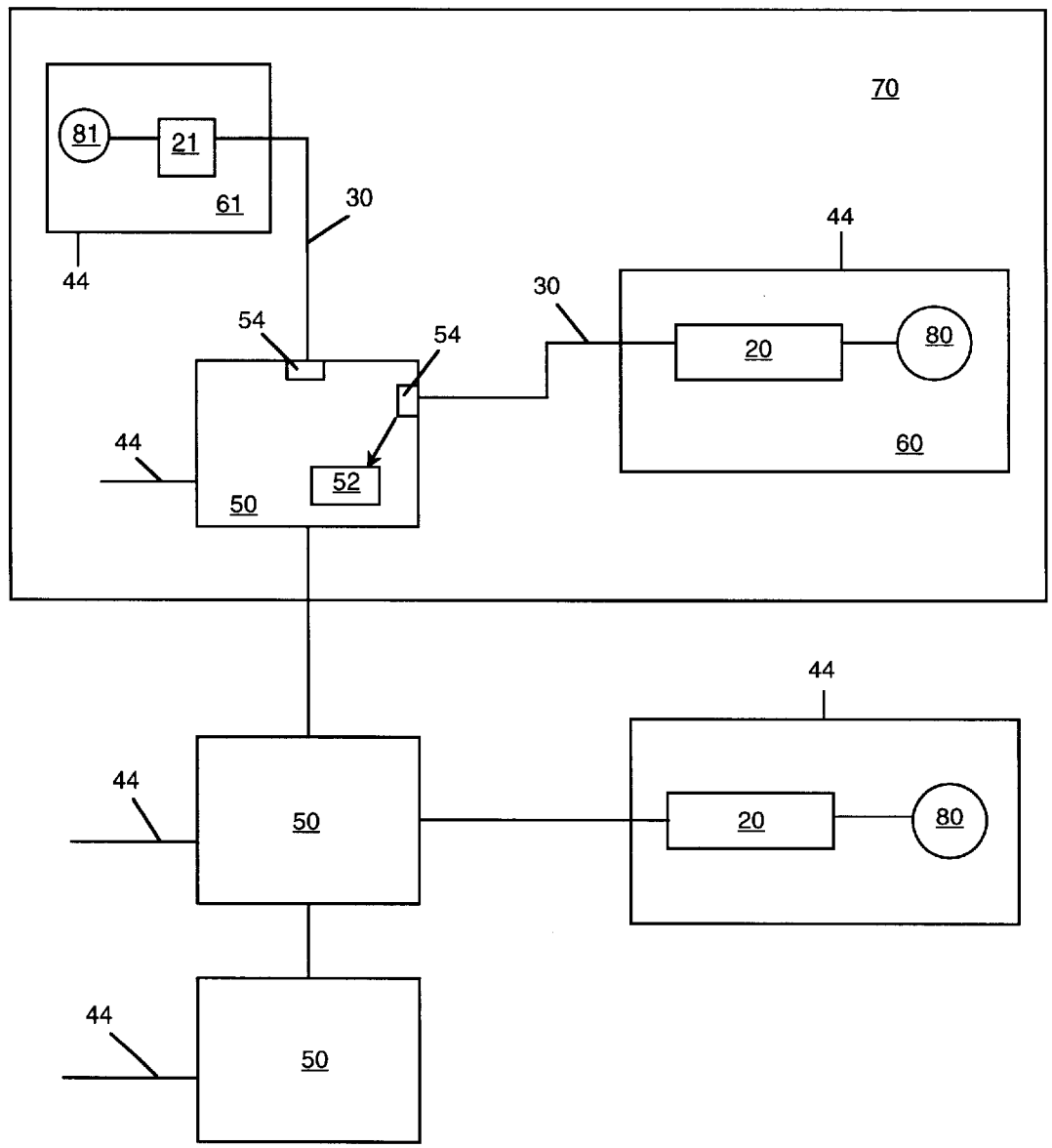
FIG. 3 is a block diagram of the system of FIGS. 1 illustrating the interconnection of the circuit elements and regions.

FIG. 3 shows a system 10 having multiple interconnected cross-bar chips 50 within quadrants 70. The cross-bar chips 50 are connected by links 30 to other cross-bar chips 50 and to cache controller chips 20, which are contained within cells 60. Each cross-bar chip may be connected to more than one cache controller chip 20. The GFC 44 is input to each cross-bar chip 50 and into each cell 60 where it connects to the processors 80 and cache controllers 20. The cache controller chips 20 are connected to processors 80 and are grouped within cells 60, which are computing elements that have one or more processors 80 and an I/O system. Each cache controller chip 20 includes a control and status register ("CSR") (not shown). Each cross-bar chip 50 and its associated cells 60 might be grouped into quadrants 70. Within each cross-bar chip 50 is CSR polling block 52 that polls the data sources.

To illustrate the process of the system, FIG. 3 also shows one particular cell 61 within the quadrant 70 having a processor 81 connected to a cache controller chip 21, which in turn is connected via a link 30 to a cross-bar chip 50. In this example, this processor 81 is the processor performing the test and may be referred to as the monarch processor 81.

This CSR reset process may occur throughout all of the CSRs in all of the cache controller chips 20 associated with all of the cross-bar chips 50 throughout the system 10. Although all of the CSRs may not reset at exactly the same time, depending upon their locations throughout the system 10, they will each reset at the same time relative to a GFC edge. The exact timing relationship between the monarch processor 81 and the reset of each particular CSR may vary, yet the timing relationship relative to the GFC edge will remain the same throughout the system 10.

Figure 4:
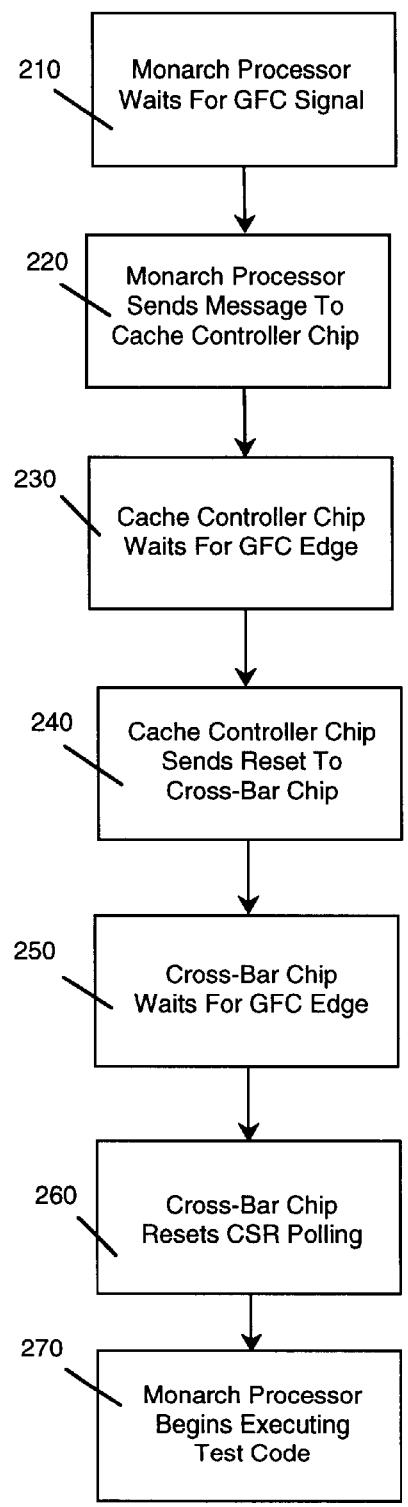
FIG. 4 is a flow chart showing the method.

FIG. 4 is a flow chart showing the method. Before running a test, the monarch processor 81 waits for the system 10 to become idle. When the monarch processor 81 runs a test, it first waits 210 for a GFC signal. When it receives this signal, the monarch processor 81 knows that its codes are synchronized with the GFC edge. At this point, the monarch processor 81 sends 220 a message to a cache controller chip 20 to initiate the reset process. The message travels across existing links 30 between the cache controller chip 21 associated with the monarch processor 81 and the destination cache controller chip 20, through any intermediate cross-bar chips 50. The message sent by the monarch processor 81 is specifically addressed to one particular cache controller chip 20.

The cache controller chip 20 then waits 230 for the next GFC clock edge and then sends 240 the Reset_CSR_Arb signal to the cross-bar chip 50 across its link 30 to the cross-bar chip 50, where it is received in a port 54. The port 54 sends a reset signal to the CSR polling block 52. The CSR polling block 52 then waits 250 for the next GFC edge, and then resets 260 the CSR polling to begin the polling at that time and to begin polling at port zero. Once the CSR polling is reset, the monarch processor 81 may begin executing 270 test code.

Although the monarch processor 81 should begin the reset process when the system is idle, in the event that the system is not idle, the system still operates. However, the reset will not occur with the correct timing, and the test may not execute with the expected repeatability relative to previous test executions.

The arbitration reset may be used to reset all polling in all cross-bar chips 50 throughout a system or subsystem. If a system is otherwise idle, a monarch processor 81 will signal one cell 60 in each other quadrant 70 of the system 10 to send the reset command, and lastly will send the reset command in its own quadrant 70. As noted, the system 10 uses existing links 30 between cross-bar chips 50 and cache controller chips 20 to transmit reset messages from the monarch processor 81 to the destination cache controller chips 20. A message may travel through multiple cross-bar chips 50 on its way to its destination. Because it is desirable to begin from an idle state, in a system using multiple cross-bar chips 50, those cross-bar chips 50 that are furthest from the monarch processor 81 should receive their reset messages before the other cross-bar chips 50. This ensures that the message from the monarch processor 81 can safely pass through intermediate idle cross-bar chips 50 without encountering traffic on the system. Lastly, then the monarch processor causes the cross-bar chip 50 in its own quadrant 70 to reset its CSR polling. It is not necessary that each cross-bar chip 50 reset at the same time; it is sufficient that they all reset at the same time relative to each other such that the machine state is the same every time the system restarts and the system is repeatable.

A system 10 may also have multiple cells 60 with cache controller chips 20 connected to the same cross-bar chip 50, such as the cross-bar chip 50 connected to the monarch processor 81 shown in FIG. 4. If more than one cache controller chip 20 is associated with a particular cross-bar chip 50, then only one of the cache controller chips 20 needs to receive the reset message from the monarch processor 81, because the cross-bar chip 50 only needs to be reset once.

An advantage of the system is that it uses existing interconnection fabric synchronizing signals to bring about the time synchronization of widely separated parts of the computer system. This saves the costs of running additional, tightly-constrained synchronizing signals. The system uses a spare code point in the existing communication protocols to cause remote parts of the system to synchronize themselves to the existing synchronization signals. This is an advantage because protocol sequences are easily sent by test software.

Although the present invention has been described in detail with reference to certain embodiments thereof, variations are possible. The present invention may be embodied in other specific forms without departing from the essential spirit or attributes thereof The invention has been illustrated in an embodiment applicable to arbitration, and more particularly to data port polling. One skilled in the art will recognize the application of the present invention to any arbiter or other system function whose state is different on succeeding occurrences of a common system reference, such as a GFC. It is desired that the embodiments described herein be considered in all respects as illustrative, not restrictive, and that reference be made to the appended claims for determining the scope of the invention.

What is claimed is:

1. A method for causing computer hardware in a system to be in the same state each time test code is executed comprising:

after the system becomes idle, generating a signal using a global framing clock whose period is an integral multiple of a system clock, the global framing clock having a plurality of clock edges;

communicating the signal from the global framing clock to a function of the system at a first clock edge of the global framing clock; and resetting the function of the system, wherein the reset occurs after the communicating at a next clock edge of the global framing clock, and wherein the function is a function that may be in a different state on succeeding cycles of the global framing clock.

2. The method of claim 1, wherein the function is performed by an arbiter.

3. The method of claim 2, wherein the arbiter is a control and status register polling block and the function is data polling.

4. The method of claim 2, wherein the signal generated using the global framing clock is a rising edge of the global framing clock.

5. The method of claim 4, wherein the step of resetting further comprises:

sending a message from a processor to a reset agent; and sending a reset arbitration signal from a reset agent to the arbiter.

6. The method of claim 5, wherein the reset agent is a cache controller chip connected to a cross-bar chip by a link.

7. The method of claim 5, wherein the step of resetting further comprises receiving a signal from the global framing clock before sending the reset arbitration signal from the reset agent to the arbiter.

8. A method of creating repeatability in a system with a common clock signal by creating repeatability in arbitration comprising:

receiving a common clock signal after the system becomes idle, the common clock signal having a plurality of clock edges;

sending a reset message from a processor to a reset agent associated with an arbiter that performs a function, wherein said function is different on succeeding common clock signals;

sending a reset signal from the reset agent to the arbiter at a first clock edge of the common clock signal; and resetting the arbiter at a next clock edge of the common clock signal.

9. The method of claim 8, wherein the reset agent is a cache controller chip associated with the arbiter, and said arbiter is in a cross-bar chip.

10. The method of claim 9, wherein the reset message and the reset arbitration signal are sent across an existing link between the cross-bar chip and the cache controller chip.

11. The method of claim 8, wherein the common clock signal is an edge of a global framing clock.

12. The method of claim 11, wherein the resetting step further comprises:

receiving an edge of the global framing clock before sending the reset arbitration signal from the reset agent to the arbiter; and receiving an edge of the global framing clock before resetting the arbiter.

13. The method of claim 8, wherein the resetting step further comprises determining that the system is idle before resetting the arbiter.

14. The method of claim 13, wherein a plurality of arbiters are reset by the processor by sending a plurality of reset messages from the processor to at least one reset agent associated with each arbiter, wherein a message is sent to reset an arbiter furthest from the processor before a message is sent to reset an arbiter closer to the processor.

15. A computer system for ensuring repeatability of a machine state during testing comprising:

an arbiter that performs a function that requires a plurality of clock cycles;

a reset agent connected to the arbiter;

a global framing clock having a lower frequency than a system clock and having a clock edge that corresponds to the clock edge of the system clock; and a processor connected to the reset agent, which processor executes test code, wherein the processor:

receives a system signal when the system becomes idle at a first clock edge of the global framing clock; and sends a reset message to the reset agent after receiving the system signal, which message causes the arbiter to reset at a next clock edge of the global framing clock.

16. The computer system of claim 15, wherein the reset agent is a cache controller chip; and the arbiter is contained within a cross-bar chip connected to the reset agent by a link.

17. The computer system of claim 15, wherein the reset agent receives the reset message from the processor;

waits for a system signal; and sends a reset arbitration signal to the arbiter; and wherein the arbiter receives the reset arbitration signal;

waits for a system signal; and resets arbitration.

18. The computer system of claim 15, further comprising:

a plurality of cross-bar chips, each of which contains an arbiter;

a plurality of reset agents connected to the plurality of cross-bar chips by links, wherein the processor sends the reset message to at least one reset agent associated with each of the plurality of arbiters, thereby causing the plurality of arbiters to reset.

19. The computer system of claim 18, wherein the reset message is sent from the processor to the reset agent associated with the arbiter furthest from the processor before the reset message is sent to closer reset agent.

* * * * *